(12) United States Patent
Hai et al.

(10) Patent No.: US 10,990,794 B2
(45) Date of Patent: Apr. 27, 2021

(54) OPERATION METHOD OF TEXTURE RECOGNITION DEVICE AND TEXTURE RECOGNITION DEVICE

(71) Applicant: BOE Technology Group Co., Ltd., Beijing (CN)

(72) Inventors: Xiaoquan Hai, Beijing (CN); Haisheng Wang, Beijing (CN); Lei Wang, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/567,844

(22) Filed: Sep. 11, 2019

(65) Prior Publication Data
US 2020/0184179 A1 Jun. 11, 2020

(30) Foreign Application Priority Data
Dec. 7, 2018 (CN) .......................... 201811495270.9

(51) Int. Cl.
*G06K 9/00* (2006.01)
*G06F 3/042* (2006.01)
(Continued)

(52) U.S. Cl.
CPC .......... *G06K 9/0004* (2013.01); *G06F 3/042* (2013.01); *G06K 9/0008* (2013.01); *G06K 9/209* (2013.01);
(Continued)

(58) Field of Classification Search
CPC ................................................. G06K 9/0004
(Continued)

(56) References Cited

U.S. PATENT DOCUMENTS

2009/0028396 A1* 1/2009 Kishima ............. A61B 5/1172
382/124
2013/0207115 A1 8/2013 Katsui et al.
(Continued)

FOREIGN PATENT DOCUMENTS

CN 106537313 A 3/2017
CN 107590428 A 1/2018
(Continued)

OTHER PUBLICATIONS

First Chinese Office Action dated May 28, 2020: Application No. 201811495270.9.

*Primary Examiner* — Long D Pham

(57) ABSTRACT

An operation method of a texture recognition device and a texture recognition device are provided. The texture recognition device includes a light source array and an image sensor array; the light source array includes a plurality of light sources; the image sensor array includes a plurality of image sensors, which are configured to receive light emitted from the light sources and reflected to the image sensors by a texture for a texture collection; the operation method includes: in a process of the texture collection performed by the image sensor array, lighting a first group of light sources continuously arranged in a first pattern at a first moment, so that the first group of light sources continuously arranged in the first pattern serve as a photosensitive light source for the image sensor array, in which a length-width ratio of a region occupied by the first pattern is larger than two.

16 Claims, 8 Drawing Sheets

(51) Int. Cl.
   *G09G 3/3208* (2016.01)
   *G06T 7/40* (2017.01)
   *G09G 3/32* (2016.01)
   *G06K 9/20* (2006.01)

(52) U.S. Cl.
   CPC ......... *G06K 9/2027* (2013.01); *G06K 9/2036* (2013.01); *G06T 7/40* (2013.01); *G09G 3/32* (2013.01); *G09G 3/3208* (2013.01)

(58) Field of Classification Search
   USPC ........................................................ 345/694
   See application file for complete search history.

(56) References Cited

U.S. PATENT DOCUMENTS

| | | |
|---|---|---|
| 2018/0012069 A1 | 1/2018 | Chung et al. |
| 2019/0026523 A1* | 1/2019 | Shen ................... H01L 51/5281 |
| 2019/0180071 A1* | 6/2019 | Kim .................... G06K 9/0004 |
| 2019/0180073 A1 | 6/2019 | Zhang et al. |
| 2019/0294851 A1* | 9/2019 | Chung ................ H01L 51/5281 |
| 2020/0184178 A1* | 6/2020 | Zhou ................... H01L 51/5237 |

FOREIGN PATENT DOCUMENTS

| | | |
|---|---|---|
| CN | 107655565 A | 2/2018 |
| CN | 107994034 A | 5/2018 |
| CN | 108875634 A | 11/2018 |

* cited by examiner

100

OPERATION METHOD OF TEXTURE RECOGNITION DEVICE AND TEXTURE RECOGNITION DEVICE

The application claims priority to the Chinese patent application No. 201811495270.9, filed on Dec. 7, 2018, the entire disclosure of which is incorporated herein by reference as part of the present application.

TECHNICAL FIELD

At least one embodiment of the present disclosure relates to an operation method of a texture recognition device and a texture recognition device.

BACKGROUND

With increasing popularity of mobile terminals, more and more users use mobile terminals to perform operations such as identity verification, electronic payment and so on. Because of the uniqueness of skin textures such as fingerprint patterns or palm print patterns, fingerprint identification technology combined with optical imaging is gradually adopted by mobile electronic devices for identity verification, electronic payment, etc. How to design a more optimized display panel structure is a focus problem in the art.

SUMMARY

At least one embodiment of the present disclosure provides an operation method of a texture recognition device, the texture recognition device has a touch side and comprises a light source array and an image sensor array; the light source array comprises a plurality of light sources, and the plurality of light sources comprise at least one first group of light sources continuously arranged in a first pattern; the image sensor array is at one side of the light source array and comprises a plurality of image sensors; the plurality of image sensors are configured to receive light emitted from the light sources and reflected to the image sensors by a texture at the touch side for a texture collection; the operation method comprises: in a process of the texture collection performed by the image sensor array, lighting the first group of light sources continuously arranged in the first pattern at a first moment, so that the first group of light sources continuously arranged in the first pattern serve as a photosensitive light source for the image sensor array. A length-width ratio of a region occupied by the first pattern is larger than two.

For example, in the operation method provided by at least one embodiment of the present disclosure, the texture recognition device comprises a display panel, the display panel comprises a pixel unit array, the pixel unit array comprises a plurality of pixel units, and the plurality of pixel units comprise at least one first group of pixel units continuously arranged in the first pattern; the light source array comprises the pixel unit array, and the plurality of light sources comprise the plurality of pixel units; the operation method comprises: in the process of the texture collection performed by the image sensor array, lighting the first group of pixel units continuously arranged in the first pattern at the first moment, so that the first group of pixel units continuously arranged in the first pattern serve as the photosensitive light source for the image sensor array.

For example, in the operation method provided by at least one embodiment of the present disclosure, the region occupied by the first pattern is a rectangular region.

For example, in the operation method provided by at least one embodiment of the present disclosure, a length of the region occupied by the first pattern is represented by L, a width of the region occupied by the first pattern is represented by D, the length-width ratio is a ratio L/D of the length to the width and is represented by K, and a value range of the K is 9≥K>2.

For example, in the operation method provided by at least one embodiment of the present disclosure, the value range of the K is 7≥K≥5.

For example, in the operation method provided by at least one embodiment of the present disclosure, the region occupied by the first pattern comprises 3×21 pixel units.

For example, in the operation method provided by at least one embodiment of the present disclosure, a minimum luminous intensity that the image sensors sense is represented by Q, an area of the region occupied by the first pattern is represented by S, and Q and S satisfy:

$$Q = \frac{I \times S \cos\theta}{H^2},$$

in which I indicates a luminous intensity of the pixel units, H indicates a distance between a surface, which is at the touch side, of the texture recognition device and the image sensor array, and θ indicates a maximum luminous angle of the pixel units.

For example, in the operation method provided by at least one embodiment of the present disclosure, a length of the region occupied by the first pattern is represented by L, a width of the region occupied by the first pattern is represented by D, the length-width ratio is represented by K and is equal to L/D, and a value of the K is selected to allow a recognition contrast, which is represented by C, of a ridge of the texture and a valley of the texture which are recognized by the image sensors to be maximized;

$$C=|R-G|/|R+G|,$$

in which R indicates a signal value of the ridge of the texture obtained by the image sensors, and G indicates a signal value of the valley of the texture obtained by the image sensors.

For example, in the operation method provided by at least one embodiment of the present disclosure, the at least one first group of pixel units continuously arranged in the first pattern comprises a plurality of first groups of pixel units continuously arranged in the first pattern in an array, in the process of the texture collection performed by the image sensor array, the plurality of first groups of pixel units continuously arranged in the first pattern in the array are controlled to be lighted at the first moment.

For example, in the operation method provided by at least one embodiment of the present disclosure, among the plurality of the first patterns in the array, a distance between adjacent first patterns is selected to allow interference between respective imaging ranges of the adjacent first patterns on the image sensor array to be lower than a threshold value.

For example, in the operation method provided by at least one embodiment of the present disclosure, among the plurality of first patterns in the may, a distance between adjacent first patterns is selected to allow respective imaging ranges of the adjacent first patterns on the image sensor array to not overlap with each other.

For example, in the operation method provided by at least one embodiment of the present disclosure, the plurality of pixel units further comprise at least one second group of pixel units continuously arranged in a second pattern, and the operation method further comprises: in the process of the texture collection performed by the image sensor array, lighting the second group pixel units continuously arranged in the second pattern at a second moment different from the first moment, so that the second group of pixel units continuously arranged in the second pattern serve as a photosensitive light source for the image sensor array, in which a length-width ratio of a region occupied by the second pattern is larger than two, and the first pattern does not overlap with the second pattern.

For example, in the operation method provided by at least one embodiment of the present disclosure, the at least one second group of pixel units continuously arranged in the second pattern comprises a plurality of second groups of pixel units continuously arranged in the second pattern in an array, and the plurality of second groups of pixel units continuously arranged in the second pattern in the array are lighted at the second moment.

For example, in the operation method provided by at least one embodiment of the present disclosure, a shape of the first pattern is same as a shape of the second pattern.

At least one embodiment of the present disclosure further provides a texture recognition device, the texture recognition device has a touch side and comprises a light source array, an image sensor array and a controller; the light source array comprises a plurality of light sources, and the plurality of light sources comprise at least one first group of light sources continuously arranged in a first pattern; the image sensor array is at one side of the light source array and comprises a plurality of image sensors; the plurality of image sensors are configured to receive light emitted from the light sources and reflected to the image sensors by a texture at the touch side for a texture collection; the controller is coupled to the light source array and is configured to control lighting of the first group of light sources continuously arranged in the first pattern at a first time in a process of the texture collection, so that the first group of light sources continuously arranged in the first pattern serve as a photosensitive light source for the image sensor array; a length-width ratio of a region occupied by the first pattern is larger than two.

For example, the texture recognition device provided by at least one embodiment of the present disclosure further comprises a display panel, the display panel comprises a pixel unit array, the pixel unit array comprises a plurality of pixel units, and the plurality of pixel units comprise at least one first group of pixel units continuously arranged in the first pattern; the light source array comprises the pixel unit array, and the plurality of light sources comprise the plurality of pixel units; the controller is configured to control lighting of the first group of pixel units continuously arranged in the first pattern at the first moment in the process of the texture collection performed by the image sensor array, so that the first group of pixel units continuously arranged in the first pattern serve as the photosensitive light source for the image sensor array.

For example, in the texture recognition device provided by at least one embodiment of the present disclosure, the display panel comprises an OLED display panel or a QLED display panel.

For example, in the texture recognition device provided by at least one embodiment of the present disclosure, the at least one first group of pixel units continuously arranged in the first pattern comprises a plurality of first groups of pixel units continuously arranged in the first pattern in an array, the controller is further configured to control lighting of the plurality of first groups of pixel units continuously arranged in the first pattern in the array at the first moment.

For example, in the texture recognition device provided by at least one embodiment of the present disclosure, the plurality of pixel units further comprise at least one second group of pixel units continuously arranged in a second pattern, and the controller is further configured to control lighting of the second group of pixel units continuously arranged in the second pattern at a second moment different from the first moment in the process of the texture collection, so that the second group of pixel units continuously arranged in the second pattern serve as a photosensitive light source for the image sensor array. A length-width ratio of a region occupied by the second pattern is larger than two, and the first pattern does not overlap with the second pattern.

For example, in the texture recognition device provided by at least one embodiment of the present disclosure, the at least one second group of pixel units continuously arranged in the second pattern comprises a plurality of second groups of pixel units continuously arranged in the second pattern in an array, the controller is further configured to control lighting of the plurality of second groups of pixel units continuously arranged in the second pattern in the array at the second moment.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

Figure 1A:
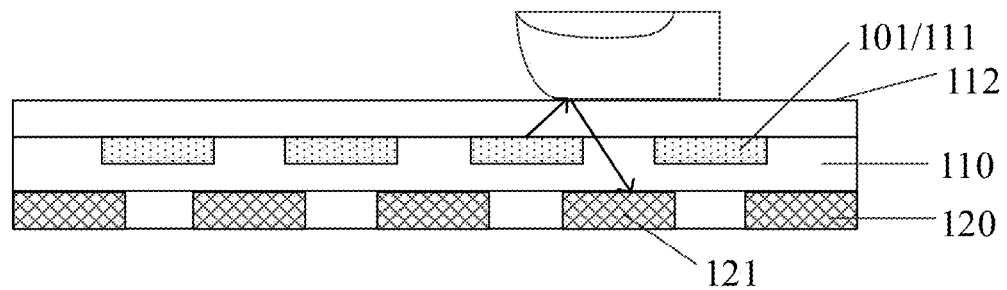
FIG. 1A is a cross-sectional schematic diagram of a texture recognition device provided by at least one embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment (s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various under-screen texture recognition function components. Also, the terms "a," "one," or "the" and the like are not intended to indicate any limitation to amounts, but represent at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "left," "right" and the like are only used to indicate relative position relationship, and when the position of the object which is described is changed, the relative position relationship may be changed accordingly.

At present, a technology of narrow border display screen is gradually becoming a mainstream. One means to realize this technology is to integrate image sensors with a fingerprint recognition function into a display screen, which realizes a fingerprint recognition mode under the screen and increases an area of a display region of the display screen.

In a process of fingerprint recognition, when a distance between a finger and an image sensor is large, because light reflected by the finger scatters, an image obtained by the image sensor is blurred, which causes an inaccurate fingerprint recognition. For example, a collimator can be arranged to modulate the light, so as to achieve a purpose of distinguishing fingerprint information. However, the display screen with the collimator has a thicker structure, which is not beneficial to achieve a thin design of the display screen. In some embodiments, light emitted by a point light source is used as a photosensitive light source, but an intensity of the light emitted by the point light source is insufficient, and it is difficult for the image sensor to be photosensitive, which results in an inaccurate fingerprint recognition.

At least one embodiment of the present disclosure provides an operation method of a texture recognition device, the texture recognition device has a touch side and comprises a light source array and an image sensor array; the light source array comprises a plurality of light sources, and the plurality of light sources comprise at least one first group of light sources continuously arranged in a first pattern; the image sensor array is at one side of the light source array and comprises a plurality of image sensors, and the plurality of image sensors are configured to receive light emitted from the light sources and reflected to the image sensors by a texture at the touch side for a texture collection; the operation method comprises: in a process of the texture collection performed by the image sensor array, lighting the first group of light sources continuously arranged in a first pattern at a first moment, so that the first group of light sources continuously arranged in the first pattern serve as a photosensitive light source for the image sensor array, in which a length-width ratio of a region occupied by the first pattern is larger than two.

At least one embodiment of the present disclosure provides a texture recognition device, the texture recognition device has a touch side and comprises a light source array, an image sensor array and a controller; the light source array comprises a plurality of light sources, and the plurality of light sources comprise at least one first group of light sources continuously arranged in a first pattern; the image sensor array is at one side of the light source array and comprises a plurality of image sensors, and the plurality of image sensors are configured to receive light emitted from the light sources and reflected to the image sensors by a texture at the touch side for a texture collection; the controller is coupled to the light source array and configured to control lighting of the first group of light sources continuously arranged in a first pattern at a first time in a process of the texture collection, so that the first group of light sources continuously arranged in the first pattern serve as a photosensitive light source for the image sensor array; a length-width ratio of a region occupied by the first pattern is larger than two.

In the following, the operation method of a texture recognition device and the texture recognition device provided by embodiments of the present disclosure are described in detail with reference to the figures.

Figure 2:
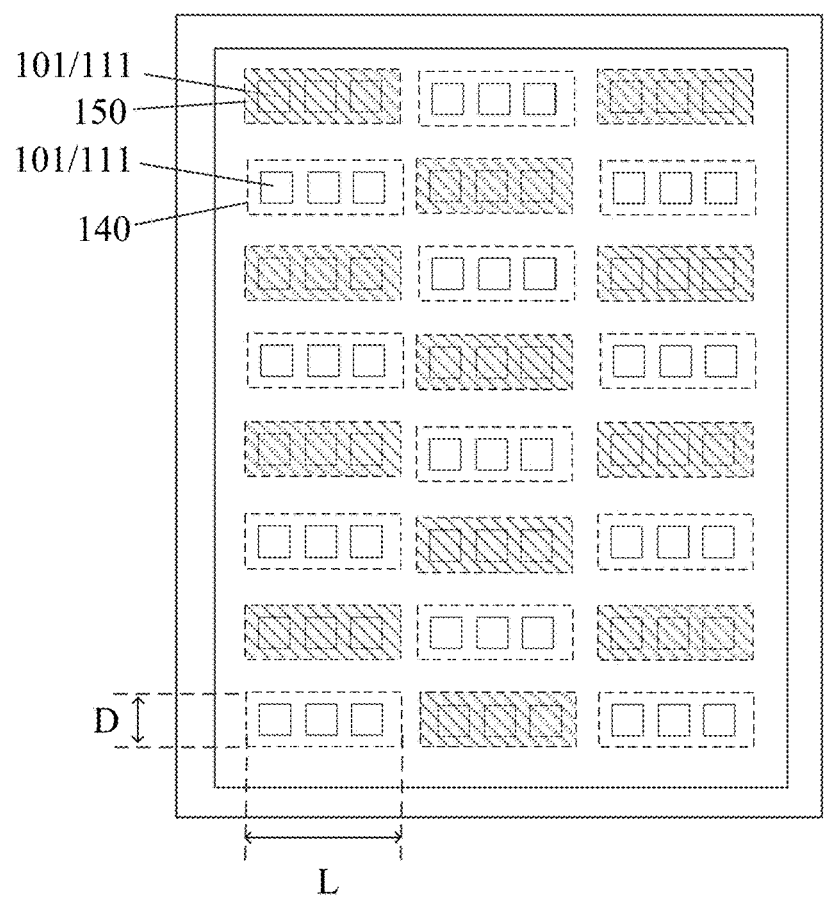
FIG. 2 is a plane schematic diagram of a texture recognition device provided by at least one embodiment of the present disclosure.

FIG. 1A is a cross-sectional schematic diagram of a texture recognition device 100 provided by at least one embodiment of the present disclosure; FIG. 2 is a plane schematic diagram of the texture recognition device 100 provided by the at least one embodiment of the present disclosure.

As illustrated in FIG. 1A and FIG. 2, the texture recognition device 100 has a touch side (illustrated as an upper side of the texture recognition device 100 in FIG. 1A) and includes a light source array and an image sensor array 120. For example, the texture recognition device 100 can be used for a texture collection, such as a fingerprint collection or a palm print collection, for a fingerprint recognition or a palm print recognition. The light source array includes a plurality of light sources 111 arranged in an array within a predetermined region, and the plurality of light sources 111 comprise at least one first group of light sources continuously arranged in a first pattern 140; the image sensor array 120 is disposed at one side of the light source array, for example, at a side, which is away from the touch side, of the light source array. The image sensor array 120 includes a plurality of image sensors 121 arranged in an array in a predetermined region. The plurality of image sensors 121 are configured to receive light emitted from the light sources 111 and reflected to the image sensors 121 by the texture for the texture collection. For example, the light reflected to the image sensors 121 is light reflected to the texture recognition device 100 by an operator with a texture, such as an operator's finger or palm. The plurality of image sensors 121 synthesize a desired texture pattern according to various electrical signals generated by the light.

The operation method of the texture recognition device 100 is as follows. In a process of touching a touch side surface 112 of the texture recognition device 100 by an operator with a texture such as the operator's finger, the texture recognition device 100 starts the texture collection. In a process of the texture collection performed by the texture recognition device 100, the first group of light sources 111 (illustrated as three light sources 111 in FIG. 2) continuously arranged in the first pattern 140 are lighted at a first moment to emit light to the touch side and are used as a photosensitive light source for the image sensor array 120, and a length-width ratio of the region occupied by the first pattern 140 is larger than two. Therefore, the region occupied by the first pattern 140 is formed as a strip-shaped region which as a whole provides a strip-shaped light source as a photosensitive light source for the image sensor array 120. The strip-shaped light source can enable the image sensor array 120 to acquire a clearer and more accurate texture image, which is described in detail later.

Referring to FIG. 1A, when an operator with a texture, such as a finger, touches the touch side surface 112 of the texture recognition device 100, the light emitted by the light sources 111 is reflected by the operator, for example, the light reaches the image sensors 121 through spaces between the light sources 111 in the light source array, and the image sensors 121 can acquire the texture image of the operator.

As mentioned above, the operator with the texture may be a hand, and the texture recognized by the image sensors 121 is a skin texture such as a fingerprint, a palm print, etc. In addition, the operator with the texture may also be a non-living body with a certain texture, such as an object with a certain texture made of a material such as a resin, and no limitation is imposed to this in embodiments of the present disclosure.

In the above embodiment, the image sensor array 120 is disposed at the side, which is away from the touch side, of the light source array, and for example, in other embodiments, the image sensor array 120 may be arranged at a same layer as the light source array, for example, the plurality of image sensors 121 included in the image sensor array 120 are arranged in a same layer as the light sources 111 and spaced apart from the light sources 111. For another example, the light source array is disposed at a side, which is away from the touch side, of the image sensor array 120. In this case, the light emitted from the light sources 111 is emitted out through spaces between adjacent image sensors 121 and reflected to the image sensors 121 by the texture. No specific limitation is imposed to the arrangement of the image sensor array 120 and the light source array in the embodiments of the present disclosure, as long as the plurality of image sensors 121 can receive the light emitted from the light sources 111 and reflected to the image sensors 121 by the texture for the texture collection.

For example, in some embodiments, the texture recognition device 100 is a display screen having an under-screen texture recognition function, and correspondingly including a display panel 110, the display panel 110 includes a pixel unit array, the pixel unit array includes a plurality of pixel units 101, and the plurality of pixel units 101 comprises at least one first group of pixel units continuously arranged in the first pattern 140. For example, the pixel unit array of the display panel 110 is implemented as the light source array, and the plurality of pixel units 101 are implemented as the plurality of light sources 111. That is, the pixel units 101 of the display panel 110 are further used as the photosensitive light source, so that a compactness of the device is improved and an arrangement difficulty of each functional structure is reduced. In this case, the operation method of the texture recognition device 100 includes: in the process of the texture collection performed by the image sensor array 120, the first group of pixel units 101 continuously arranged in the first pattern 140 are lighted at the first moment to serve as the photosensitive light source for the image sensor array 120. For example, the pixel units 101 in an entire display region of the display panel 110 are controllable to be further used as the photosensitive light source, and the image sensor array 120 may be correspondingly arranged under the entire display region, so as to realize a full screen texture recognition.

In other embodiments, a display screen having an under-screen texture recognition function includes a display panel 110 and light emitting elements separately provided as the photosensitive light source for realizing the texture recognition, and these light emitting elements are disposed, for example, between adjacent pixel units in the pixel unit array or disposed to overlap the pixel units.

For example, in some embodiments, the region occupied by the first pattern 140 is a rectangular region. It should be noted that in the embodiments of the present disclosure, the region occupied by the first pattern also includes modified forms of the rectangular region, such as an arc-shaped region, a parallelogram region, a runway-shaped region, a triangle region, or the like. Each of these shapes as a whole are still in a strip-shaped shape, and in which a dimension in one direction (referred to as "length") is larger than a dimension in the other direction (referred to as "width").

Figure 3A:
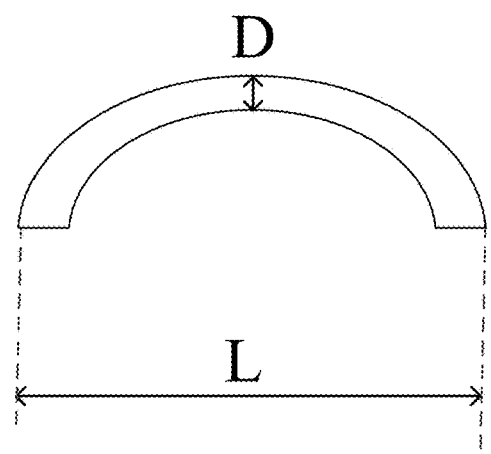
FIG. 3A-FIG. 3D are schematic diagrams of a photosensitive light source in a first pattern in a texture recognition device provided by at least one embodiment of the present disclosure.
Figure 3B:
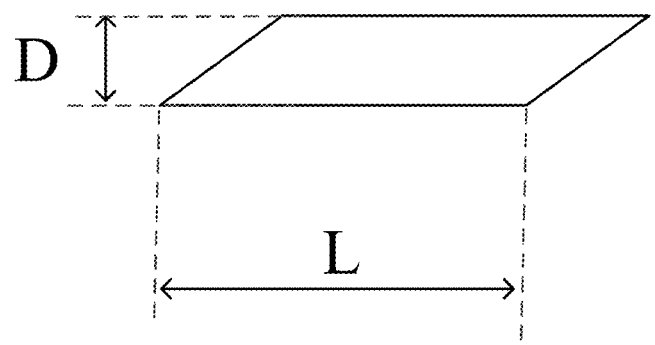
Figure 3C:
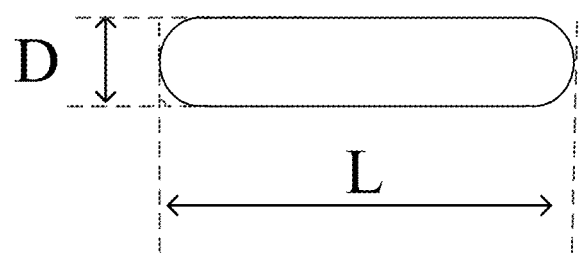
Figure 3D:
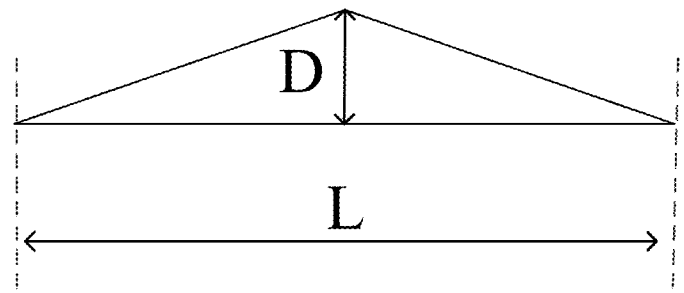

For example, a length of the region occupied by the first pattern 140 is represented by L, a width of the region occupied by the first pattern 140 is represented by D, and the length-width ratio of the region occupied by the first pattern 140 is L/D. In a case where the region occupied by the first pattern 140 is the rectangular region, as illustrated in FIG. 2, L is the length of the rectangle and D is the width of the rectangle. As illustrated in FIG. 3A, in a case where the region occupied by the first pattern 140 is an arc-shaped region, L is a distance between two ends of the arc, and D is a width of the arc in a direction perpendicular to an extension direction of the arc. As illustrated in FIG. 3B, in a case where the region occupied by the first pattern 140 is a parallelogram region, L is a length of a bottom edge of the parallelogram, and D is a height of the parallelogram. As illustrated in FIG. 3C, in a case where the region occupied by the first pattern 140 is a runway-shaped region, L is a distance between two arc tops of the runway-shaped region, and D is a distance between two parallel edges of the runway-shaped region. As illustrated in FIG. 3D, in a case where the region occupied by the first pattern 140 is a triangle region, L is a length of a bottom edge of the triangle, and D is a height of the triangle. For example, in some embodiments, the region occupied by the first pattern 140 may also be in other shapes, and the length L and the width D of the shapes may be defined according to the above rules.

Figure 4:
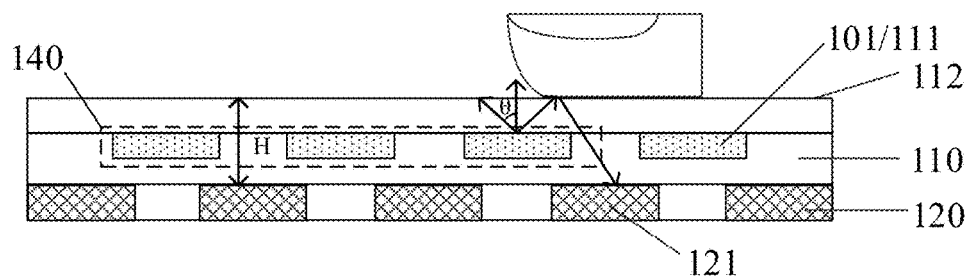
FIG. 4 is a cross-sectional schematic diagram of further another texture recognition device provided by at least one embodiment of the present disclosure.

For example, in some embodiments, a minimum luminous intensity that the image sensors 121 sense is represented by Q, an area of the region occupied by the first pattern 140 is represented by S, and Q and S satisfy:

$$Q = \frac{I \times S \cos\theta}{H^2}$$

in which I indicates a luminous intensity of the pixel units 101, H indicates a distance between a surface 112, which is at the touch side, of the texture recognition device 100 and the image sensor array 120, and θ indicates a maximum luminous angle of the pixel units 101, as illustrated in FIG. 4. In this embodiment, the maximum luminous angle θ of the pixel units 101 is a maximum angle formed by the light emitted by the pixel units 101 and a direction (a vertical direction in the figure) perpendicular to the surface 112, which is at the touch side, of the texture recognition device 100.

In a case where Q and S satisfy the above relationship, the photosensitive light source in the first pattern 140 just meets a sensing requirement of the image sensors 121, which provides a theoretical basis for a size design of the first pattern 140.

For example, in some embodiments, because the ridges and valleys of the textures have different reflection intensities to the light emitted by the photosensitive light source, a signal value of the ridge of the texture and a signal value of the valley of the texture which are collected by the image sensors are different from each other. The length-width ratio is a ratio L/D of the length to the width of the region occupied by the first pattern 140 and is represented by K, and a value of the K is selected to allow a recognition contrast, which is represented by C, of the ridge of the texture and the valley of the texture which are recognized by the image sensors 121 to be maximized, in which $C=|R-G|/|R+G|$.

R indicates a signal value of the ridge of the texture obtained by the image sensors, and indicates is a signal value of the valley of the texture obtained by the image sensors. The signal value is, for example, a luminance value.

Therefore, in a case where the area S of the region occupied by the first pattern 140 is constant, K can be selected according to the above formula to further design the shape and the parameters of the first pattern 140. For example, the recognition contrast C of the ridge of the texture and the valley of the texture which are recognized by the image sensors 121 under different values of the K can be obtained through experiments, and thus an optimal value of the K is obtained for designing the shape and parameters of the first pattern 140, and further how to light the plurality of pixel units 101 as the photosensitive light source is determined. Thus, the image sensors 121 can obtain a clear and accurate texture image.

For example, in some embodiments, a value range of the K is 9≥K>2, so that the region occupied by the first pattern 140 is formed as a thin strip-shaped region, and the photosensitive light source for the image sensor array 120 is formed as a thin strip-shaped light source. For example, in some embodiments, the value range of the K is 7≥K≥5, and according to a test, in this case, the recognition contrast C of the ridge of the texture and the valley of the texture recognized by the image sensors 121 is larger, so that the image sensors 121 can obtain a clear and accurate texture image, and the texture recognition device 100 can accurately recognize the texture image.

Figure 5A:
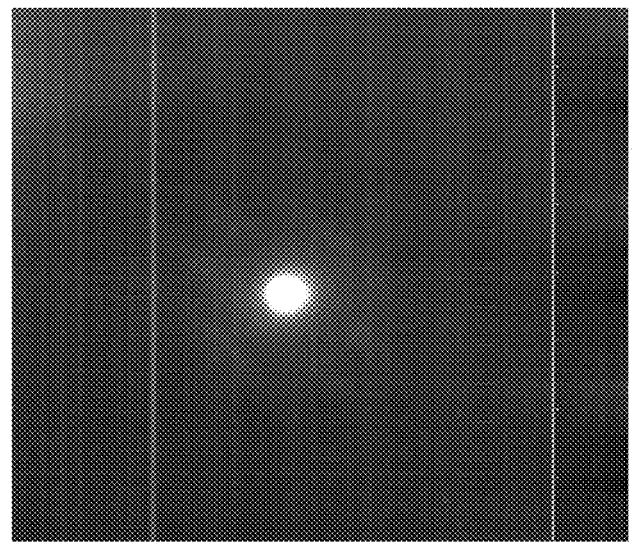
FIG. 5A-FIG. 5B are diagrams of results of testing imaging effects of photosensitive light sources of different forms.
Figure 5B:
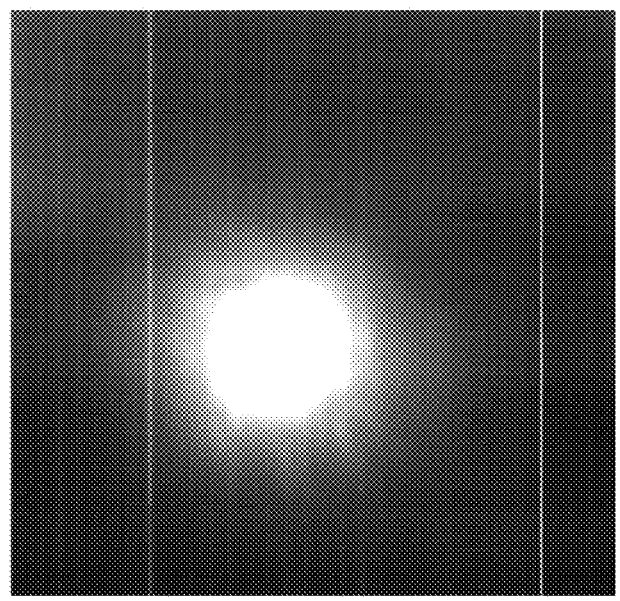
Figure 6:
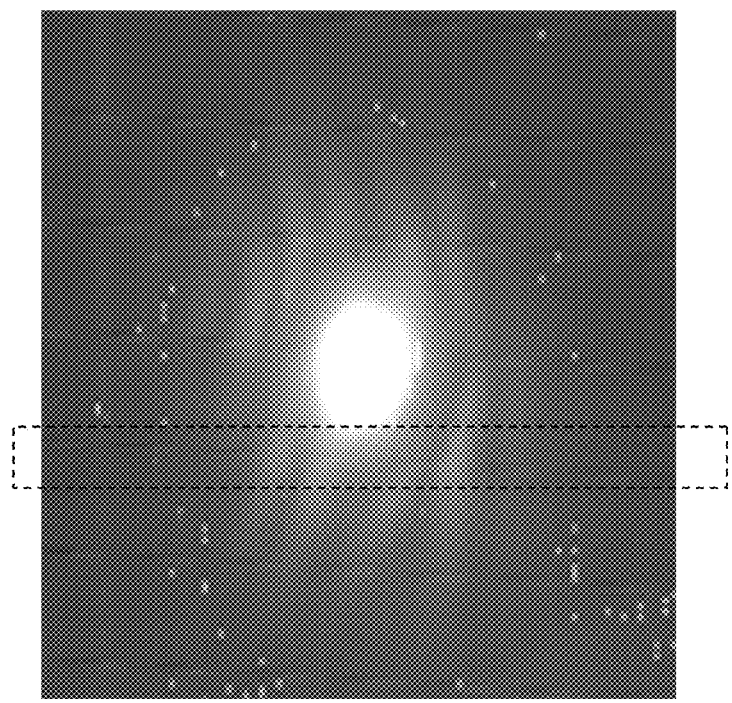
FIG. 6 is an imaging effect diagram of a photosensitive light source in a first pattern in a texture recognition device provided by at least one embodiment of the present disclosure.

For example, in an example, the imaging effect of the first pattern 140 in different shapes is tested by experiments. In a case where the first pattern 140 includes only one pixel unit 101, that is, the photosensitive light source is a point light source, as illustrated in FIG. 5A, the image sensors 121 do not acquire a texture image because of insufficient photoreception. In one example, when the area S of the region occupied by the first pattern 140 is obtained according to the minimum luminous intensity Q sensed by the image sensors 121, in combination with an area occupied by each of the pixel units 101, the number of pixel units 101 included in the first pattern 140 is determined to be about 63. At this time, in a case where the region occupied by the first pattern 140 is a square region and includes 8×8 pixel units 101, that is, in a case where the value of the K is about 1, as illustrated in FIG. 5B, the image sensors 121 cannot acquire a texture image because of excessive photoreception and crosstalk of acquiring images due to a centralized arrangement of the pixel units 101. In a case where the region occupied by the first pattern 140 is a rectangular region and includes 3×21 pixel units (for example, the 3×21 pixel units are arranged in an array which comprises 3 rows and 21 columns or comprises 21 rows and 3 columns), that is, in a case where the value of the K is about 7, the recognition contrast C of the ridge of the texture and the valley of the texture which are recognized by the image sensors 121 is the largest, and a clear texture image as illustrated in FIG. 6 is obtained (a stripe image is circled by a dotted line frame in FIG. 6). Therefore, the 3×21 pixel units can be controlled to be lighted (that is, the first pattern 140 including 3×21 pixel units serves as the photosensitive light source for the image sensor array 120), so that the image sensors 121 perform the texture collection, and the image sensors 121 can obtain a clear and accurate texture image to improve a recognition accuracy of the texture recognition device 100 for the texture.

Figure 7:
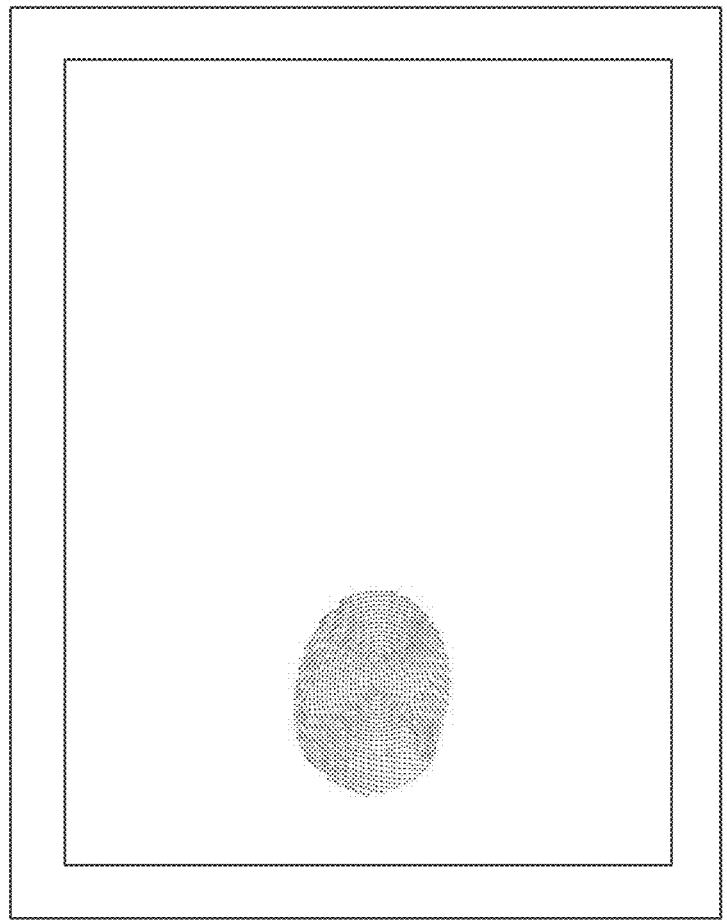
FIG. 7 is a schematic diagram of a texture collection performed by a texture recognition device provided by at least one embodiment of the present disclosure.

For example, in some embodiments, as illustrated in FIG. 7, when an operator with a texture, such as a finger, touches the surface 112, which is at the touch side, of the texture recognition device 100, a touch area of the finger may be larger than the area of the region occupied by the first pattern 140, therefore, more pixel units 101 can be lighted simultaneously or in a time-sharing manner to form a plurality of the first patterns 140 arranged in an array, so as to enable the image sensor array 120 to obtain a fingerprint texture image with a larger area (for example, a complete fingerprint texture image). As illustrated in FIG. 2, a plurality of the first patterns 140 are arranged in an array and spaced apart from each other, and accordingly, a distribution region of the image sensor array 120 is wider, and for example, the image sensor array 120 is configured to provide a detection function on the entire touch side.

For example, the at least one first group of pixel units continuously arranged in the first pattern comprises a plurality of first groups of pixel units continuously arranged in the first pattern in an array, in the process of the texture collection performed by the image sensor array 120, the plurality of first groups of pixel units continuously arranged in the first pattern in the array are controlled to be lighted at the first moment, and in this case, the image sensor array 120 can obtain a plurality of portions of a texture image, and the plurality of portions can form an image as a whole for recognition.

Figure 8A:
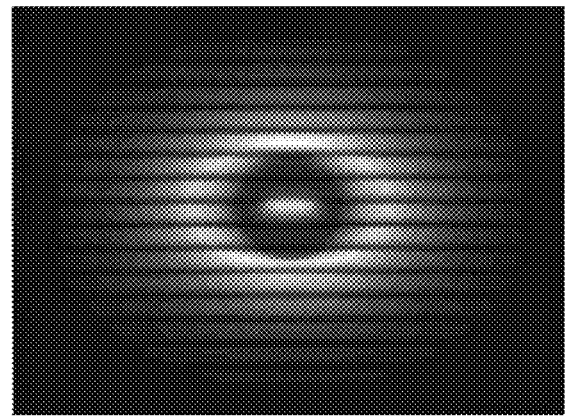
FIG. 8A-FIG. 8B are schematic diagrams of imaging ranges of a photosensitive light source in a first pattern in a texture recognition device provided by at least one embodiment of the present disclosure.
Figure 8B:
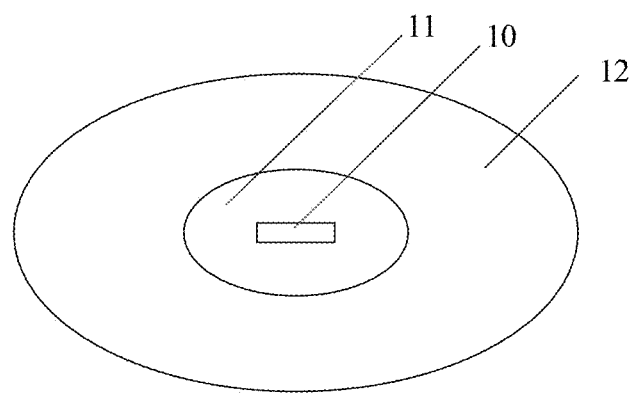

FIG. 8A shows an imaging simulation diagram of the plurality of pixel units 101 in the first pattern 140 when lighted, and FIG. 8B is a simplified line diagram of FIG. 8A. As illustrated in FIG. 8B, an imaging image of the first pattern 140 includes a highlight region 10, a dark region 11 and an imaging region 12. Generally, it is difficult to obtain a clear texture image in the highlight region 10 and the dark region 11, and the imaging region 12 is mainly used to obtain the texture image. Among the plurality of first patterns 140 arranged in the array, it is required that a certain distance is between adjacent first patterns 140, so as to avoid an imaging interference caused by overlapping portions of imaging regions 12 of the adjacent first patterns 240.

For example, in some embodiments, among the plurality of the first patterns 140 arranged in the array, the distance between the adjacent first patterns 140 is selected to allow interference between respective imaging ranges of the adjacent first patterns on the image sensor array 120 to be lower than a threshold value, so as to prevent the image collected by the image sensors 121 in the image sensor array 120 from being blurred because of the crosstalk, thus to avoid an inaccuracy of the image collected.

For example, in some embodiments, in order to further reduce the interference, among the plurality of first patterns 140 arranged in the array, the distance between the adjacent first patterns 140 is selected to allow respective imaging ranges of the adjacent first patterns 140 on the image sensor array 120 to not overlap with each other, that is, the respective imaging ranges of the adjacent first patterns 140 on the image sensor array 120 have no overlap with each other. As a result, each of the image sensors 121 can obtain a clear texture image, so that the recognition accuracy of the texture recognition device 100 for the texture is improved. In this case, a plurality of pixel units 101 are disposed in the space between the adjacent first patterns 140.

For example, in some embodiments, because of the certain distance between the adjacent first patterns 140, the plurality of portions of the texture image obtained by using the plurality of first patterns 140 in the array may not be complete. In order to obtain a more complete and more accurate texture image, as illustrated in FIG. 2, for example, the plurality of light sources further comprise at least one second group of light sources continuously arranged in a second pattern 150, and the operation method further includes: in the process of the texture collection performed by the image sensor array 120, lighting the second group of light sources continuously arranged in the second pattern 150 at a second moment different from the first moment, so that the second group of light sources continuously arranged in the second pattern serve as a photosensitive light source for the image sensor array 120. For the embodiment about a under-screen texture recognition display screen, for example, the plurality of pixel units 101 further comprise at least one second group of pixel units continuously arranged in a second pattern 150, and in the process of the texture collection performed by the image sensor array 120, lighting the second group of pixel units 101 continuously arranged in the second pattern 150 at a second moment different from the first moment, so that the second group of pixel units 101 continuously arranged in the second pattern serve as a photosensitive light source for the image sensor array 120. For example, a length-width ratio of a region occupied by the second pattern 150 is larger than two, and the first pattern 140 and the second pattern 150 do not overlap with each other, that is, the first pattern 140 and the second pattern 150 have no overlap with each other. For example, in some embodiments, a shape of the first pattern 140 is the same as a shape of the second pattern 150.

For example, as illustrated in FIG. 2, the at least one second group of pixel units continuously arranged in the second pattern comprises a plurality of second groups of pixel units continuously arranged in the second pattern 150 in an array, and the plurality of second groups of pixel units continuously arranged in the second pattern 150 in the array are lighted at the second moment. For example, a distance between adjacent second patterns 150 is selected to allow interference between respective imaging ranges of the adjacent second patterns 150 on the image sensor array 120 to be lower than a threshold value, so as to prevent the image collected by the image sensors 121 in the image sensor array 120 from being blurred because of the crosstalk, thus to avoid the inaccuracy of the image collected.

For example, in some embodiments, in order to further reduce the interference, among the plurality of second patterns 150 in the array, the distance between the adjacent second patterns 150 is selected to allow respective imaging ranges of the adjacent second patterns 150 on the image sensor array 120 to not overlap with each other, that is, the respective imaging ranges of the adjacent second patterns 150 on the image sensor array 120 have no overlap with each other. As a result, each of the image sensors 121 can obtain a clear texture image, so that the recognition accuracy of the texture recognition device 100 for the texture is improved.

For example, the second patterns 150 and the first patterns 140 are spaced apart from each other and form a spaced arrangement as illustrated in FIG. 2. In these embodiments, a complete, clear and accurate texture image can be obtained by lighting the plurality of first patterns 140 arranged in the array and the plurality of second patterns 150 arranged in the array in a time-sharing manner.

In this embodiment, the image sensor array can acquire a clear and accurate texture image by controlling the lighting of the pixel units in a certain pattern as the photosensitive light source for the image sensor array, and thus the recognition accuracy of the texture recognition device is improved. In addition, by lighting the pixel units in different regions in a time-sharing manner, an overall recognition of a larger texture can be realized, so that the recognition accuracy of the texture recognition device is further improved.

It should be noted that in the embodiments of the present disclosure, the display panel 110 and the image sensor 121 may be various forms, which is not limited by the embodiments of the present disclosure.

For example, in some embodiments, the display panel 110 is an organic light emitting diode (OLED) display panel, a quantum dot light emitting diode (QLED) display panel, or the like, and the embodiments of the present disclosure are not limited in this aspect. The OLED display panel is, for example, a flexible OLED display panel. The OLED display panel has a self-luminous characteristic, and light emission of its display pixel unit can be controlled or modulated according to needs, which provides convenience for the texture collection and helps to improve an integration level of the device.

For example, the display panel 110 includes, in addition to the pixel unit array, signal lines (including gate lines, data lines, detection lines, etc.) for providing electrical signals (including scanning signals, data signals, detection signals, etc.), and each of the pixel units 101 in the pixel unit array includes, for example, three subpixels, that is, a red subpixel, a green subpixel, and a blue subpixel, each of the subpixels includes a light emitting device (for example, an OLED device), a pixel driving circuit (for example, including thin film transistors, capacitors, etc.) for driving the light emitting device (OLED device) to emit light, and so on. For example, light emitting states of the light emitting device are controlled by the driving circuit to realize the lighting of the pixel units and form the first patterns 140, the second patterns 150, and so on, which serve as the photosensitive light sources.

For example, in some embodiments, the image sensors 121 can be various suitable types of image sensors such as charge coupled device (CCD) type image sensors, complementary metal oxide semiconductor (CMOS) type image sensors, photodiodes, or the like. According to needs, for example, the image sensors 121 only sense light of a certain wavelength (for example, red light or green light), or may sense all visible light. For example, the image sensors 121 are coupled to a processor (for example, an integrated circuit chip) through lead wires, so that the collected texture image can be transmitted to the processor in a form of data signals, and the processor can realize operations such as the texture recognition. For example, the processor may be implemented by a general-purpose processor or a special-purpose processor, and the embodiments of the present disclosure are not limited in this aspect.

Figure 1B:
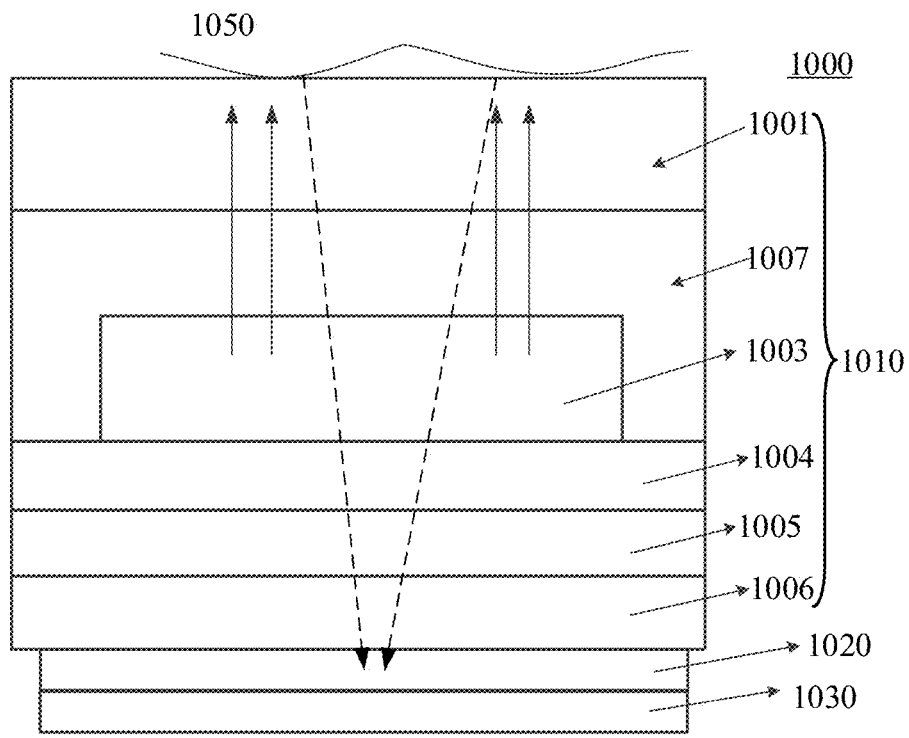
FIG. 1B is a cross-sectional schematic diagram of another texture recognition device provided by at least one embodiment of the present disclosure.

FIG. 1B is a cross-sectional schematic diagram of another texture recognition device provided by at least one embodiment of the present disclosure. The embodiment provides a specific structure of the display panel and a combination mode of the display panel and the image sensor array. Referring to FIG. 1B, the texture recognition device 1000 includes a display panel 1010 and an image sensor array 1030. The display panel 1010 is an OLED display panel.

As illustrated in FIG. 1B, the OLED display panel 1010 includes a top film 1001, an encapsulation thin film 1007, a pixel unit array 1003, a flexible substrate 1004, a filter function layer 1005, a bottom film 1006, and so on. In the display panel 1010, a stack of the filter function layer 1005 and the bottom film 1006 as a whole provides a filter layer with a filter function and functions as a bottom film of the display panel 1010, and the bottom film is located at a back side of the display panel 1010, specifically, at a side opposite to the pixel unit array 1003 of the flexible substrate 1004.

The bottom film 1006 provides a protection function and a support function for other structures and functional layers located thereon, the bottom film 1006 is, for example, a plastic substrate or a glass substrate with a higher strength. The filter function layer 1005 is located on the bottom film 1006 and is used for filtering impurity light. The filter function layer 1005 may include one or more of an infrared light filter function layer, an ultraviolet light filter function layer, a visible light filter function layer and a far infrared light filter function layer. The flexible substrate 1004 is used to provide a buffering function, and is, for example, a flexible substrate made of polyimide (PI), polypropylene (PP), polycarbonate (PC), or the like.

The pixel unit array 1003 is formed on the flexible substrate 1004 and includes a plurality of pixel units arranged in a predetermined array and signal lines (including gate lines, data lines, detection lines, etc.) for providing electrical signals (including scanning signals, data signals, detection signals, etc.), each of the pixel units includes a light emitting device (for example, an OLED device), a pixel driving circuit for driving the light emitting device (OLED device) to emit light, and so on. The pixel driving circuit is coupled with the signal lines, so that the pixel driving circuit can receive corresponding control signals and driving voltages, and drive the light emitting device to emit light according to needs, so as to perform functions of display, touch control or texture (such as the fingerprint or the palm print) recognition, etc. The light emitted by the pixel units can be used for display and used as incident light for an under-screen texture detection. Specifically, the light emitted by the light emitting devices in the pixel units during operation is reflected by an operator 1050 (for example, a finger or a palm) at the display side of the display panel 1010 for the user's skin texture image recognition.

The encapsulation thin film 1007 covers the pixel unit array 1003 to prevent external water vapors from entering the pixel unit array 1003 which causes aging or deterioration of the pixel unit array 1003, and the encapsulation thin film 1007 may be a multi-layer encapsulation thin film including, for example, an inorganic insulating layer and an organic insulating layer which are stacked, and the like.

The top film 1001 may be a cover plate, such as a substrate or thick film made of glass or plastic, for providing support and protection, and for example, for users to touch, press, etc.

The OLED display panel 1010 may also include other structures or functional layers as required. For example, the OLED display panel 1010 includes a touch structure for realizing a touch function. The touch structure may be disposed inside the pixel unit array 1003, or formed on the top film, etc., and for example, the touch structure may be of a capacitive type, a resistive type, or the like.

In order to realize an under-screen texture (fingerprint) detection function, the top film 1001, the encapsulation thin film 1007, the flexible substrate 1004, the filter function layer 1005 and the bottom film 1006 are at least partially transparent. The light (a solid arrow) emitted by the light emitting devices in the pixel units during operation is reflected by the operator 1050 at the display side of the display panel 1010, and reflected light (a dashed arrow) is incident to the image sensor array 1030, so that the image sensor array 1030 can perform imaging, and the image obtained is used to realize the subsequent fingerprint recognition operation. The image sensor array 1030 may include a prism film 1020 disposed on a light entrance side of the image sensor array 1030, and the image sensor array 1030 is combined with the bottom film 1006 by the prism film 1020, so that the image sensor array 1030 is stacked with the display panel 1010 and is disposed at a side, which faces the image sensor array 1030, of the bottom film 1006 of the display panel, and the light reflected by the operator 1050 at the display side of the display panel 1010 is incident to the image sensor array 1030 through the prism film 1020.

An operation mode of the texture recognition device 1000 is the same as that of the above-mentioned embodiment, and is not repeated here.

Figure 9:
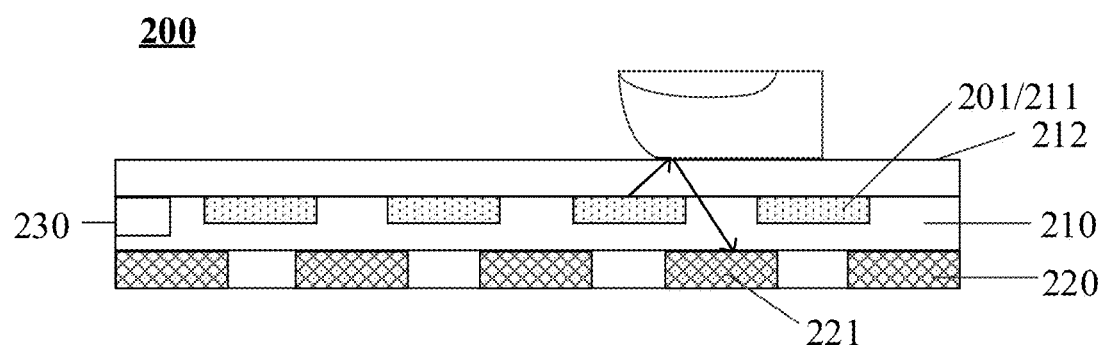
FIG. 9 is a cross-sectional schematic diagram of further another texture recognition device provided by at least one embodiment of the present disclosure.
Figure 10:
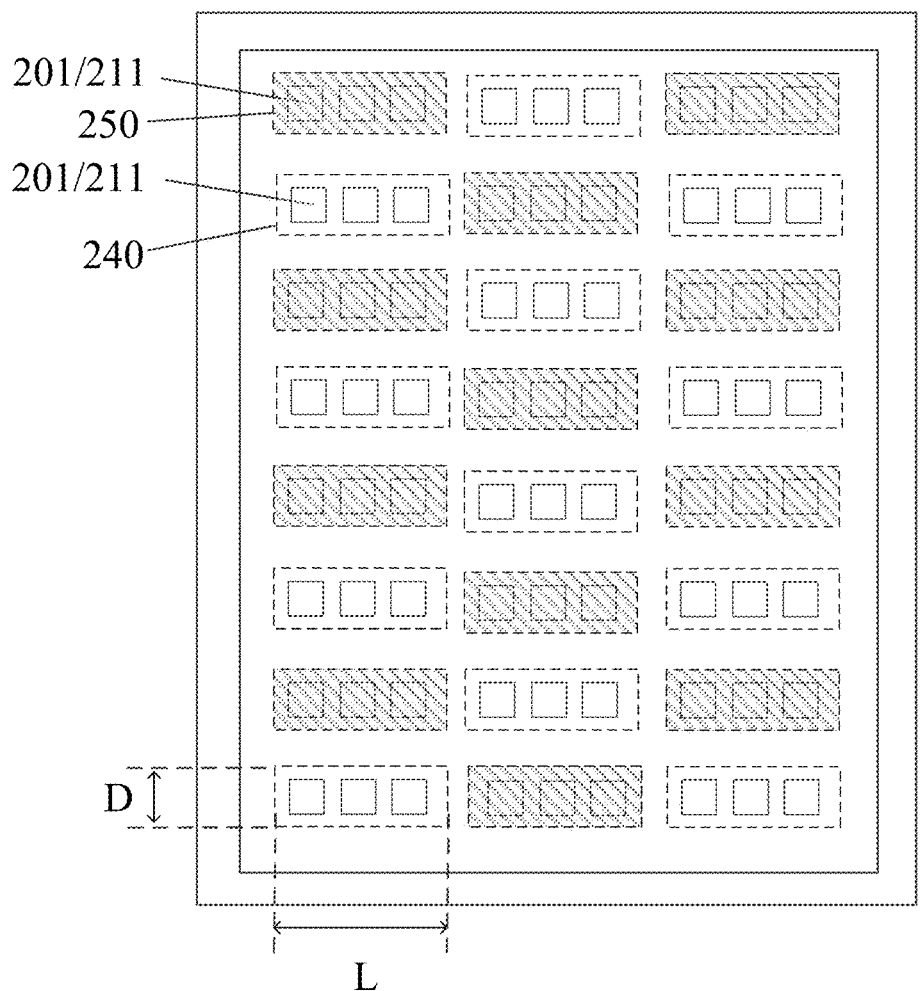
FIG. 10 is a plane schematic diagram of another texture recognition device provided by at least one embodiment of the present disclosure.

At least one embodiment of the present disclosure further provides a texture recognition device, FIG. 9 is a cross-sectional schematic diagram of a texture recognition device 200 provided by the at least one embodiment of the present disclosure; FIG. 10 is a plane schematic diagram of the texture recognition device 200 provided by the at least one embodiment of the present disclosure.

As illustrated in FIG. 9 and FIG. 10, the texture recognition device 200 has a touch side (illustrated as an upper side of the texture recognition device 200 in the figure), and includes a light source array, an image sensor array 220, and a controller 230. The light source array includes a plurality of light sources 211, and the plurality of light sources 211 comprise at least one first group of light sources continuously arranged in a first pattern. The image sensor array 220 is disposed at a side, which is away from the touch side, of the light source array and includes a plurality of image sensors 221 configured to receive light incident from the touch side for a texture collection. The controller 230 is coupled to the light source array and is configured to control lighting of the first group of light sources 211 continuously arranged in the first pattern 240 at a first moment in a process of the texture collection, so that the first group of light sources continuously arranged in the first pattern serve as a photosensitive light source for the image sensor array 220. A length-width ratio of the region occupied by the first pattern 240 is larger than two. As a result, the region occupied by the first pattern 240 is formed as a strip-shaped region, and the photosensitive light source for the image sensor array 220 is formed as a strip-shaped light source. The thin strip-shaped light source can enable the image sensor array 220 to acquire a clearer and more accurate texture image (described in detail later).

As illustrated in FIG. 9, when an operator with a texture, such as a finger, touches the touch side surface 212 of the texture recognition device 200, light emitted by the light sources 211 is reflected by the operator and reaches the image sensors 221, and the image sensors 221 can acquire the texture image of the operator.

In the above embodiment, the image sensor array 220 is disposed at the side, which is away from the touch side, of the light source array, and for example, in other embodiments, the image sensor array 220 may be arranged at a same layer as the light source array, for example, the plurality of image sensors 221 included in the image sensor array 220 are arranged in a same layer as the light source 211 and spaced apart from the light sources 211. For another example, the light source array is disposed at a side, which is away from the touch side, of the image sensor array 220. In this case, the light emitted from the light source 211 is emitted out from spaces between adjacent image sensors 221 and reflected to the image sensors 221 by the texture. No specific limitation is imposed to the arrangement of the image sensor array 220 and the light source array in the embodiments of the present disclosure, as long as the plurality of image sensors 221 can receive the light emitted from the light sources 211 and reflected to the image sensors 221 by the texture for the texture collection.

For example, in some embodiments, the texture recognition device 200 includes a display panel 210 which includes a pixel unit array, the pixel unit array includes a plurality of pixel units 201, and the plurality of pixel units 201 comprise at least one first group of pixel units continuously arranged in the first pattern. For example, the pixel unit array of the display panel 210 is implemented as the light source array, and the plurality of pixel units 201 are implemented as the plurality of light sources 211. In this case, the controller 230 is coupled to the light source array and is configured to control lighting of the first group of pixel units 201 continuously arranged in the first pattern 240 at the first moment in the texture collection process, so that the first group of pixel units 201 continuously arranged in the first pattern serve as the photosensitive light source for the image sensor array 220.

For example, in some embodiments, the region occupied by the first pattern 140 is a rectangular region. It should be noted that in the embodiments of the present disclosure, the region occupied by the first pattern also includes modified forms of the rectangular region, such as an arc-shaped region, a parallelogram region, a runway-shaped region, a triangle region, or the like. Each of these shapes as a whole are still in a strip-shaped shape, and in which a dimension in one direction (referred to as "length") is larger than a dimension in the other direction (referred to as "width").

For example, a length of the region occupied by the first pattern 240 is represented by L, a width of the region occupied by the first pattern 240 is represented by D, and the length-width ratio of the region occupied by the first pattern 240 is represented by L/D. In a case where the region occupied by the first pattern 240 is the rectangular region, as illustrated in FIG. 10, L is the length of the rectangle and D is the width of the rectangle. Similarly, referring to FIG. 3A-FIG. 3D, the length L and the width D of the first pattern 240 in different shapes can be defined.

Figure 11:
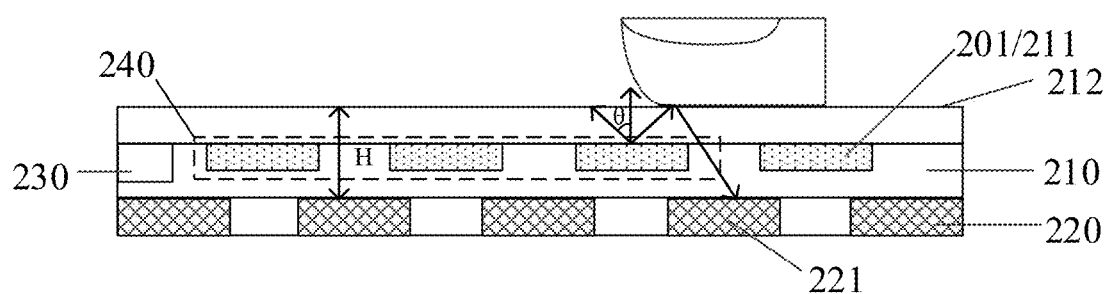
FIG. 11 is a cross-sectional schematic diagram of further another texture recognition device provided by at least one embodiment of the present disclosure.

Moreover, similarly to the above, a minimum luminous intensity that the image sensors 221 sense is represented by Q, and the length-width ratio L/D is K. An area of the region occupied by the first pattern 240 is represented by S, and Q and S satisfy:

$$Q = \frac{I \times S \cos\theta}{H^2},$$

in which I indicates a luminous intensity of the pixel units 101, H indicates a distance between a surface 212, which is at the touch side, of the texture recognition device 200 and the image sensor array 220, and θ indicates a maximum luminous angle of the pixel units 201, as illustrated in FIG. 11. In this embodiment, the maximum luminous angle θ of the pixel units 201 is a maximum angle formed by the light emitted by the pixel units 201 and a direction (a vertical direction in the figure) perpendicular to the surface 212, which is at the touch side, of the texture recognition device 200.

In a case where Q and S satisfy the above relationship, the photosensitive light source in the first pattern 240 just meets a sensing requirement of the image sensors 221, which provides a theoretical basis for a size design of the first pattern 240.

For example, in some embodiments, a ratio L/D of the length to the width of the region occupied by the first pattern 140 is K, and a value of the K is selected to allow a recognition contrast, which is represented by C, of the ridge of the texture and the valley of the texture which are recognized by the image sensors 221 to be maximized, in which $$C=|R-G|/|R+G|.$$

R indicates a signal value of the ridge of the texture obtained by the image sensors, and G indicates a signal value of the valley of the texture obtained by the image sensors. The signal value is, for example, a luminance value.

Therefore, in a case where the area S of the region occupied by the first pattern 240 is constant, K can be selected according to the above formula to further design the shape and parameters of the first pattern 240. For example, the recognition contrast C of the ridge of the texture and the valley of the texture which are recognized by the image sensors 221 under different values of K can be obtained through experiments, and thus an optimal value of the K is obtained for designing the shape and the parameters of the first pattern 240, and further how to light the plurality of pixel units 201 as the photosensitive light source is determined. Thus, the image sensors 221 can obtain a clear and accurate texture image.

For example, in some embodiments, a value range of K is 9≥K>2, so that the region occupied by the first pattern 240 is formed as a thin strip-shaped region, and the photosensitive light source for the image sensor array 220 is formed as a thin strip-shaped light source. For example, in some embodiments, the value range of the K is 7≥K≥5, and in this case, the recognition contrast C of the ridge of the texture and the valley of the texture which are recognized by the image sensors 221 is larger, so that the image sensors 221 can obtain a clear and accurate texture image, and the texture recognition device 200 can accurately recognize the texture image.

For example, in an example, In a case where the region occupied by the first pattern 240 is the rectangular region and includes 3×21 pixel units, that is, in a case where the value of the K is about 7, the recognition contrast C of the ridge of the texture and the valley of the texture which are recognized by the image sensors 221 is the largest, and a clear texture image as illustrated in FIG. 6 is obtained (a stripe image is circled by a dotted line frame in FIG. 6). Therefore, the 3×21 pixel units are controlled to be lighted (that is, the first pattern 240 including 3×21 pixel units serves as the photosensitive light source for the image sensor array 220), so that the image sensors 221 perform the texture collection, and thus the image sensors 221 can obtain a clear and accurate texture image to improve a recognition accuracy of the texture recognition device 200 for the texture.

For example, in some embodiments, as illustrated in FIG. 7, when an operator with a texture, such as a finger, touches the surface 212, which is at the touch side, of the texture recognition device 200, a touch area of the finger may be larger than the area of the region occupied by the first pattern 240, therefore, more pixel units 101 can be lighted simultaneously or in a time-sharing manner to form a plurality of first patterns 240 arranged in an array, so as to enable the image sensor array 220 to obtain a complete fingerprint texture image.

For example, the at least one first group of pixel units continuously arranged in the first pattern comprises a plurality of first groups of pixel units continuously arranged in the first pattern 240 in an array, and the controller 230 is configured to control lighting of the plurality of first groups of pixel units continuously arranged in the first pattern 240 in the array at the first moment, and in this case, the image sensor array 220 can obtain a plurality of portions of a texture image which can form an image as a whole for recognition.

Similarly, among the plurality of first patterns 240 in the array, it is required that a certain distance is between adjacent first patterns 240, so as to avoid an imaging interference caused by overlapping portions of the imaging regions of adjacent first patterns 240. For example, among the plurality of the first patterns 240 in the array, the distance between the adjacent first patterns 240 is selected to allow interference between respective imaging ranges of the adjacent first patterns on the image sensor array 220 to be lower than a threshold value, or the distance between the adjacent first patterns 240 is selected to allow respective imaging ranges of the adjacent first patterns 240 on the image sensor array 220 to not overlap with each other, that is, the respective imaging ranges of the adjacent first patterns 240 on the image sensor array 220 have no overlap with each other.

For example, in some embodiments, because of the certain distance between the adjacent first patterns 240, the plurality of portions of the texture image obtained by using the plurality of first patterns 240 in the array may not be complete. In order to obtain a more complete and more accurate texture image, for example, the plurality of pixel units further comprise at least one second group of pixel units continuously arranged in a second pattern, and the controller 230 is further configured to control lighting of the second group of pixel units 201 continuously arranged in the second pattern 250 at a second moment different from the first moment in the process of the texture collection, so that the second group of pixel units continuously arranged in the second pattern serve as a photosensitive light source for the image sensor array 220. For example, a length-width ratio of a region occupied by the second pattern 250 is larger than two, and the first pattern 240 does not overlap with the second pattern 250, that is, the first pattern 240 and the second pattern 250 have no overlap with each other. For example, in some embodiments, a shape of the first pattern 240 is same as a shape of the second pattern 250.

For example, as illustrated in FIG. 10, the at least one second group of pixel units continuously arranged in the second pattern comprises a plurality of second groups of pixel units continuously arranged in the second pattern 250 in an array, and the controller 230 is configured to control the lighting of the plurality of second groups of pixel units 201 continuously arranged in the second pattern 250 in the array at the second moment. For example, a distance between adjacent second patterns 250 is selected to allow interference between respective imaging ranges of the adjacent second patterns 250 on the image sensor array 220 to be lower than a threshold value, or the distance between the adjacent second patterns 250 is selected to allow respective imaging ranges of the adjacent second patterns 250 on the image sensor array 220 to not overlap with each other, that is, the respective imaging ranges of the adjacent second patterns 250 on the image sensor array 220 have no overlap with each other. As a result, each of the image sensors 221 can obtain a clear texture image, so that the recognition accuracy of the texture recognition device 200 for the texture is improved.

For example, the second patterns 250 and the first patterns 240 are spaced apart from each other and form a spaced arrangement as illustrated in FIG. 10. In this case, a complete, clear and accurate fingerprint image can be obtained by lighting the plurality of first patterns 240 arranged in the array and the plurality of second patterns 150 arranged in the array in a time-sharing manner.

In this embodiment, the image sensor array can acquire a clear and accurate texture image by controlling the lighting of the pixel units in a certain pattern as the photosensitive light source for the image sensor array, and thus the recognition accuracy of the texture recognition device is improved. In addition, by lighting the pixel units in different regions in a time-sharing manner, an overall recognition of a larger texture can be realized, so that the recognition accuracy of the texture recognition device is further improved.

It should be noted that in the embodiments of the present disclosure, the display panel 210, the image sensor 221 and the controller 230 may by various forms, and no limitation is imposed to this in the embodiments of the present disclosure.

For example, in some embodiments, the display panel 210 is an organic light emitting diode (OLED) display panel, a quantum dot light emitting diode (QLED) display panel, or the like, and no limitation is imposed to this in the embodiments of the present disclosure. The OLED display panel is, for example, a flexible OLED display panel. The OLED display panel has a self-luminous characteristic, and light emission of its display pixel unit can be controlled or modulated according to needs, which provides convenience for the texture collection and helps to improve an integration level of the device.

For example, the display panel 210 includes, in addition to the pixel unit array, signal lines (including gate lines, data lines, detection lines, etc.) for providing electrical signals (including scanning signals, data signals, detection signals, etc.), and each of the pixel units 201 in the pixel unit array includes, for example, three subpixels, that is, a red subpixel, a green subpixel, and a blue subpixel, each of the subpixels includes a light emitting device (for example, an OLED device) and a pixel driving circuit (for example, including thin film transistors, capacitors, etc.) for driving the light emitting device (OLED device) to emit light, etc. For example, light emitting states of the light emitting device are controlled by the driving circuit to realize the lighting of the pixel units, and form the first patterns 240, the second patterns 250, and so on, which serve as the photosensitive light sources.

For example, in some embodiments, the image sensors 221 can be various suitable types of image sensors such as charge coupled device (CCD) type image sensors, complementary metal oxide semiconductor (CMOS) type image sensors, photodiodes, or the like. According to needs, for example, the image sensors 221 only sense light of a certain wavelength (for example, red light or green light), or may sense all visible light. For example, the image sensors 221 are coupled to a processor (for example, an integrated circuit chip) through lead wires, so that the collected texture image can be transmitted to the processor in a form of data signals, and the processor can realize operations such as the texture recognition. For example, the processor may be implemented by a general-purpose processor or a special-purpose processor, and no limitation is imposed to this in the embodiments of the present disclosure.

For example, the controller 230 may be various types of integrated circuit chips with processing functions, which may have various computing architectures, such as a complex instruction set computer (CISC) architecture, a reduced instruction set computer (RISC) architecture, or a structure that implements a combination of multiple instruction sets. In some embodiments, the controller 230 may be a microprocessor, such as an X86 processor or an ARM processor, or may be a digital signal processor (DSP) or the like.

For example, in some embodiments, the controller 230 further includes a memory for storing a control program for lighting a plurality of light sources forming a certain shape, a control program for lighting a plurality of light sources in different regions in a time-sharing manner, and the like. For example, the storage unit may be any form of storage medium, such as a volatile memory or a nonvolatile memory, such as a semiconductor memory or a magnetic medium memory, and the embodiments of the present disclosure are not limited thereto.

The following should be noted:

(1) The accompanying drawings involve only the structure(s) in connection with the embodiment(s) of the present disclosure, and other structure(s) can be referred to common design(s).

(2) For clarity, in accompanying drawings for illustrating the embodiment(s) of the present disclosure, the thickness of a layer or a structure may be enlarged or reduced. However, it should understood that, in the case in which a component or element such as a layer, film, area, substrate or the like is referred to be "on" or "under" another component or element, it may be directly on or under the another component or element or a component or element is interposed therebetween.

(3) In case of no conflict, embodiments of the present disclosure and the features in the embodiments may be mutually combined to obtain new embodiments.

What have been described above are only specific implementations of the present disclosure, the protection scope of the present disclosure is not limited thereto. The protection scope of the present disclosure should be based on the protection scope of the claims.

What is claimed is:

1. An operation method of a texture recognition device, the texture recognition device having a touch side and comprising:

a light source array comprising a plurality of light sources, the plurality of light sources comprising at least one first group of light sources continuously arranged in a first pattern, and an image sensor array at one side of the light source array and comprising a plurality of image sensors, wherein the plurality of image sensors are configured to receive light emitted from the light sources and reflected to the image sensors by a texture at the touch side for a texture collection, and the operation method comprising:

in a process of the texture collection performed by the image sensor array, lighting the first group of light sources continuously arranged in the first pattern at a first moment, so that the first group of light sources continuously arranged in the first pattern serve as a photosensitive light source for the image sensor array, wherein a length-width ratio of a region occupied by the first pattern is larger than two;

wherein the texture recognition device comprises a display panel, the display panel comprises a pixel unit array, the pixel unit array comprises a plurality of pixel units, and the plurality of pixel units comprise at least one first group of pixel units continuously arranged in the first pattern;

the light source array comprises the pixel unit array, and the plurality of light sources comprise the plurality of pixel units;

the operation method comprises:

in the process of the texture collection performed by the image sensor array, lighting the first group of pixel units continuously arranged in the first pattern at the first moment, so that the first group of pixel units continuously arranged in the first pattern serve as the photosensitive light source for the image sensor array;

wherein the plurality of pixel units further comprise at least one second group of pixel units continuously arranged in a second pattern, and the operation method further comprises:

in the process of the texture collection performed by the image sensor array, lighting the second group of pixel units continuously arranged in the second pattern at a second moment different from the first moment, so that the second group of pixel units continuously arranged in the second pattern serve as a photosensitive light source for the image sensor array, wherein a length-width ratio of a region occupied by the second pattern is larger than two, and the first pattern does not overlap with the second pattern.

2. The operation method according to claim 1, wherein the region occupied by the first pattern is a rectangular region.

3. The operation method according to claim 1, wherein a length of the region occupied by the first pattern is represented by L, a width of the region occupied by the first pattern is represented by D, the length-width ratio is a ratio L/D of the length to the width and is represented by K, and a value range of the K is $9 \geq K > 2$.

4. The operation method according to claim 3, wherein the value range of the K is $7 \geq K \geq 5$.

5. The operation method according to claim 1, wherein the region occupied by the first pattern comprises 3×21 pixel units.

6. The operation method according to claim 1, wherein a minimum luminous intensity that the image sensors sense is represented by Q, an area of the region occupied by the first pattern is represented by S, and Q and S satisfy:

$$Q = \frac{I \times S\cos\theta}{H^2},$$

wherein I indicates a luminous intensity of the pixel units, H indicates a distance between a surface, which is at the touch side, of the texture recognition device and the image sensor array, and θ indicates a maximum luminous angle of the pixel units.

7. The operation method according to claim 1, wherein a length of the region occupied by the first pattern is represented by L, a width of the region occupied by the first pattern is represented by D, the length-width ratio is represented by K and is equal to L/D, and a value of the K is selected to allow a recognition contrast, which is represented by C, of a ridge of the texture and a valley of the texture which are recognized by the image sensors to be maximized, wherein

C=|R−G|/|R+G|,

R indicates a signal value of the ridge of the texture obtained by the image sensors, and G indicates a signal value of the valley of the texture obtained by the image sensors.

8. The operation method according to claim 1, wherein the at least one first group of pixel units continuously arranged in the first pattern comprises a plurality of first groups of pixel units continuously arranged in the first pattern in an array, in the process of the texture collection performed by the image sensor array, the plurality of first groups of pixel units continuously arranged in the first pattern in the array are controlled to be lighted at the first moment.

9. The operation method according to claim 8, wherein among the plurality of the first patterns in the array, a distance between adjacent first patterns is selected to allow interference between respective imaging ranges of the adjacent first patterns on the image sensor array is lower than a threshold value.

10. The operation method according to claim 8, wherein among the plurality of the first patterns in the array, a distance between adjacent first patterns is selected to allow respective imaging ranges of the adjacent first patterns on the image sensor array to not overlap with each other.

11. The operation method according to claim 1, wherein the at least one second group of pixel units continuously arranged in the second pattern comprises a plurality of second groups of pixel units continuously arranged in the second pattern in an array, the plurality of second groups of pixel units continuously arranged in the second pattern in the array are lighted at the second moment.

12. The operation method according to claim 1, wherein a shape of the first pattern is same as a shape of the second pattern.

13. A texture recognition device, having a touch side and comprising:

a light source array comprising a plurality of light sources, the plurality of light sources comprising at least one first group of light sources continuously arranged in a first pattern;

an image sensor array at one side of the light source array and comprising a plurality of image sensors, wherein the plurality of image sensors are configured to receive light emitted from the light sources and reflected to the image sensors by a texture at the touch side for a texture collection; and a controller coupled to the light source array and configured to control lighting of the first group of light sources continuously arranged in the first pattern at a first moment in a process of the texture collection, so that the first group of light sources continuously arranged in the first pattern serve as a photosensitive light source for the image sensor array, wherein a length-width ratio of a region occupied by the first pattern is larger than two;

the texture recognition device further comprises a display panel, wherein the display panel comprises a pixel unit array, the pixel unit array comprises a plurality of pixel units, and the plurality of pixel units comprise at least one first group of pixel units continuously arranged in the first pattern;

the light source array comprises the pixel unit array, and the plurality of light sources comprise the plurality of pixel units;

the controller is configured to control lighting of the first group of pixel units continuously arranged in the first pattern at the first moment in the process of the texture collection performed by the image sensor array, so that the first group of pixel units continuously arranged in the first pattern serve as the photosensitive light source for the image sensor array;

the plurality of pixel units further comprise at least one second group of pixel units continuously arranged in a second pattern, and the controller is further configured to control lighting of the second group of pixel units continuously arranged in the second pattern at a second moment different from the first moment in the process of the texture collection, so that the second group of pixel units continuously arranged in the second pattern serve as a photosensitive light source for the image sensor array, wherein a length-width ration of a region occupied by the second pattern is larger than two, and the first pattern does not overlap with the second pattern.

14. The texture recognition device according to claim 13, wherein the display panel comprises an organic light emitting diode (OLED) display panel or a quantum dot light emitting diode (QLED) display panel.

15. The texture recognition device according to claim 13, wherein the at least one first group of pixel units continuously arranged in the first pattern comprises a plurality of first groups of pixel units continuously arranged in the first pattern in an array, the controller is further configured to control lighting of the plurality of first groups of pixel units continuously arranged in the first pattern in the array at the first moment.

16. The texture recognition device according to claim 13, wherein the at least one second group of pixel units continuously arranged in the second pattern comprises a plurality of second groups of pixel units continuously arranged in the second pattern in an array, the controller is further configured to control lighting of the plurality of second groups of pixel units continuously arranged in the second pattern in the array at the second moment.

* * * * *